United States Patent [19]

Ho et al.

[11] 4,111,852

[45] Sep. 5, 1978

[54] PRE-GLASSING METHOD OF PRODUCING HOMOGENEOUS SINTERED ZNO NON-LINEAR RESISTORS

[75] Inventors: Shih M. Ho, Wilkinsburg; Tapan K. Gupta, Monroeville, both of Pa.

[73] Assignee: Westinghouse Electric Corp., Pittsburgh, Pa.

[21] Appl. No.: 755,774

[22] Filed: Dec. 30, 1976

[51] Int. Cl.² ............................................. H01B 1/08
[52] U.S. Cl. .................................. 252/518; 252/519; 252/520; 252/521
[58] Field of Search ....................... 252/519, 520, 521; 106/40 V

[56] References Cited

U.S. PATENT DOCUMENTS

| | | | |
|---|---|---|---|
| 3,663,458 | 5/1972 | Masuyama et al. | 252/518 |
| 3,838,378 | 9/1974 | Matsuoka et al. | 338/21 X |
| 3,950,274 | 4/1976 | May | 252/519 |

*Primary Examiner*—Benjamin R. Padgett
*Assistant Examiner*—E. Suzanne Parr
*Attorney, Agent, or Firm*—D. P. Cillo

[57] ABSTRACT

A method of making a homogeneous sintered body, which can exhibit non-linear V-I characteristics, comprises the steps of: (1) forming a single phase, chemically homogeneous glass, from a mixture of oxides containing at least $Bi_2O_3$, which is effective to cause non-linearity within a ZnO ceramic body, (2) mixing 2.5 wt.% to 40 wt.% of the single phase, chemically homogeneous $Bi_2O_3$ type glass, with 60 wt.% to 97.5 wt.% of ZnO particles, to form a uniform mixture, (3) pressing the glass-ZnO mixture, to form a consolidated body, and (4) sintering the pressed body, to form a ceramic body consisting of ZnO particles and a chemically homogeneous insulating layer formed from the $Bi_2O_3$ type glass coating the ZnO particles and bonding the ZnO particles together.

6 Claims, 3 Drawing Figures

PRE-GLASSING METHOD OF PRODUCING HOMOGENEOUS SINTERED ZNO NON-LINEAR RESISTORS

BACKGROUND OF THE INVENTION

Unwanted voltage surges have long been a critical problem to circuit designers of industrial and home electrical systems. Surges generated by load switching are often repetitive and range as high as 2,500 V. Lightning generated surges can range up to or over 6,000 V.

Surge protective devices have been made from SiC. It is also known that ZnO when mixed with certain oxide additives and sintered into pellets, can exhibit non-linear V-I characteristics superior to SiC. These additive modified ZnO compositions are, therefore, candidate materials for non-linear lightning arrester and similar type components.

In the sintered body, the sintered ZnO grains will be coated and bound with the oxide additives. These oxide additives are effective to produce electrical non-linearity completely within the bulk of the body. The voltage limiting characteristic of these surge protective materials is believed to be due to the character of the oxide additive within the grain boundary of the body of the material, which is near-insulating at low voltage and conducting at a high voltage.

ZnO non-linear devices have been made by mixing additive oxides, as individual powders, with ZnO powder, and then pressing and sintering, as taught by Matsuoka et al, in U.S. Pat. No. 3,663,458. In that patent, ZnO powder is mixed in a wet mill for 5 hours with additive materials such as $Bi_2O_3$, $Sb_2O_3$, CoO and MnO, as individual powders, to produce a homogeneous mixture. A binder such as water or polyvinyl alcohol can be added. The mixture was then molded at about 340 kg./sq. cm. (4,800 psi.) and sintered at 1,000° C to 1,450° C for 1 to 3 hours, providing 1.3 cm. diameter by 0.05 to 0.25 cm. thick discs. Matsuoka et al, in U.S. Pat. No. 3,838,378, more thoroughly mixed ZnO powder in a wet mill for 24 hours with individual additive oxide powders and $CeF_3$ powder, to produce a mixture to which a binder could be added. The mixture was then molded at 250 kg./sq. cm. (3,500 psi.) and sintered at 1,000° C to 1,450° C for 1 to 10 hours, to provide bulk voltage non-linear bodies for lightning arresters, with dimensions as large as 3.5 to 4 cm. diameter and 2 cm. thickness.

We have found that mixing the materials is one of the most important operations in making non-linear lightning arrester components and non-linear resistors, because the physical homogeneity of the product, and the reproducibility of the electrical characteristics, will depend on thorough mixing of the component powders. By merely milling or blend-mixing the ingredients, even for 24 hours, only a marginally acceptable product is produced, resulting in a large percentage of lightning arrester components and resistors being rejected due to varying electrical properties caused by lack of homogeneity.

The grain boundary phase has been formed, in the prior art, by chemical reaction between the individual oxide additives in the sintering step of the process to form the resistor bodies. We have found that it is essential that the grain boundary phase be completely chemically homogeneous, and represent the equilibrium condition of the oxide additive reactant products. This means that the chemical reactions of the oxide additives must go to completion during the time that a single phase glass is being formed. Conventional fabrication methods of mixing component ZnO powder with 7 or 8 individual oxide additives, and then sintering in an attempt to reduce the mixture to a 2 component system, does not achieve the desired completely homogeneous grain boundary layer.

SUMMARY OF THE INVENTION

In the method of this invention, the above problems are solved by forming an additive glass composition from a mixture of oxides containing at least $Bi_2O_3$ prior to mixing with ZnO particles. The oxides that can be used to make the glass, include metallic oxides such as: $TiO_2$, $Ta_2O_5$, FeO, $In_2O_3$, $Al_2O_3$, $SnO_2$, $Sn_3O_4$, $Mo_2O$, BaO, SrO, PbO, NiO, CaO, MgO and $CeF_3$, and preferably $Bi_2O_3$, $Sb_2O_3$, $Co_3O_4$, CoO, MnO, $MnO_2$, $B_2O_3$, ZnO, $SiO_2$, and $Cr_2O_3$, their equivalents and their mixtures. Glass made from these oxides can be effective to cause electrical non-linearity within a ZnO ceramic body.

A single phase glass is first made from a mixture of these additive oxides. The oxides are mill-mixed and then melted in a crucible at a temperature of between about 1,100° to about 1,600° C, for a time effective to provide a single phase, chemically homogenous glass melt. The glass melt is then quenched in ice water. The glass is then milled and mixed with ZnO, in the ratio of 2.5 to 40 weight % glass to 60 to 97.5 weight % ZnO. After mill-mixing the ZnO and the oxide glass, the powder mixture is pressed into a consolidated body of substantially uniform density.

The pressed body is then heated to form a sintered pellet, at a temperature of between about 900° C to about 1,400° C, for a time effective to sinter the pressed body. This process provides pellets having a microstructure consisting of a bulk phase of ZnO particles, and a boundary phase containing the oxide insulating layer binding the ZnO grains together. By this pre-glassing process, an extremely homogeneous, well-defined, and reproducible boundary layer is formed between the ZnO grains during the final sintering step, and sharp, non-linear V-I characteristics are obtained.

BRIEF DESCRIPTION OF THE DRAWINGS

For a better understanding of the invention, reference may be made to the preferred embodiment, exemplary of the invention, shown in the accompanying drawings, in which.

DESCRIPTION OF THE PREFERRED EMBODIMENTS

Figure 1:
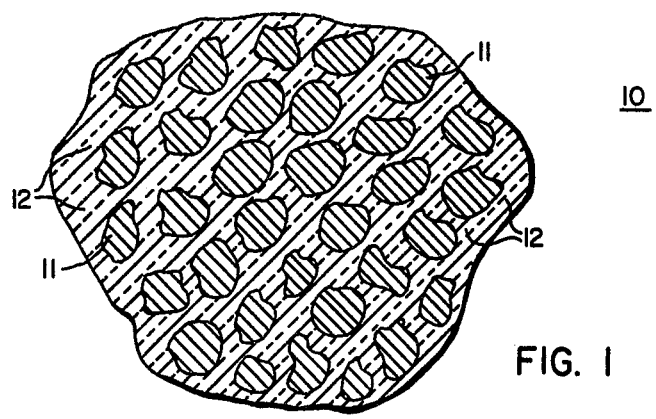
FIG. 1 is a cross-sectional view through a pellet made by the method of this invention, showing the ZnO grains and the grain boundary of oxide additives.

According to the invention, there is provided a homogeneous sintered body, useful as voltage-non-linear resistors, comprising a major portion of from 60 weight % to 97.5 weight %, preferably about 65 weight to about 85 weight % of ZnO, and an effective minor amount of any oxide insulation that will cause electrical non-linearity completely within the bulk of the body, generally between 2.5 weight % to 40 weight %.

The additive glass is selected from metal oxides including $TiO_2$, $Ta_2O_5$, FeO, $In_2O_3$, $Al_2O_3$, $SnO_2$, $Sn_3O_4$, $Mo_2O$, $BaO$, $SrO$, $PbO$, $NiO$, $CaO$, $MgO$ and $CeF_3$, and preferably $Bi_2O_3$, $Sb_2O_3$, $Co_3O_4$, $CoO$, $MnO$, $MnO_2$, $B_2O_3$, $ZnO$ and $Cr_2O_3$, their equivalents and their mixtures. Less than 2.5 weight percent additive oxide insulating glass and the sintered body will remain a conductor. Greater than 40 weight percent additive oxide insulating glass and the sintered body will remain an insulator.

As an initial step, a single phase, chemically homogeneous glass is made from a mixture of these metal oxides. The oxide additive powder mixture, preferably containing about 10 mole % to about 60 mole % of $Bi_2O_3$ and about 15 mole % to about 75 mole % of other oxides, including good glass formers such as $SiO_2$, $B_2O_3$, are grind-mixed in a ball mill for about 18 hours to about 30 hours.

The oxide powder mixture is placed in a refractory crucible or other suitable high temperature container, and is then heated at a temperature effective to provide a single phase, chemically homogeneous liquid glass melt. Melting is carried out, generally in a furnace containing silicon carbide resistive heating elements, for about 2 hours to about 4 hours at a temperature of between about 1,100° C to about 1,600° C.

The admixture of the preferred glass will consist of: about 10 to about 60 mole % of $Bi_2O_3$; about 5 to about 15 mole % of $ZnO$; about 2 to about 15 mole % of $MnO_2$; about 2 to about 10 mole % of $Co_3O_4$; about 5 to about 40 mole % of $SiO_2$; about 1 to about 15 mole % of $B_2O_3$ and from 0 to about 30 mole % of $Sb_2O_3$. The $B_2O_3$ and $SiO_2$ are generally included to insure that the glass will not devitrify during quenching. The $Bi_2O_3$, $ZnO$, $MnO_2$ and $Co_3O_4$ are believed to be the main components which provide non-linear characteristics in the sintered pellet. The final glass composition may differ somewhat from the powder mixture due to evaporation of some oxides above 1,200° C and corrosion of crucible materials such as silica.

The molten glass is then cooled by quenching, i.e., pouring the molten glass into ice water to form a solid, porous glass. The quenched glass may then be broken up by any suitable means and ball-milled in acetone or other organic solvents for about 10 hours to about 30 hours. The fine glass powder is then air-dried to remove the solvent, and screened to provide an average particle size of between about 0.5 micron to about 125 microns diameter.

This glass powder is then added to ZnO powder, in the proportions described hereinabove, and grind-mixed in acetone or other organic solvent in a ball mill, for about 10 hours to about 30 hours, to provide a homogeneous mixture. The wet mixture is then air-dried to remove the solvent, and screened to provide an average particle size of between about 0.5 micron to about 125 microns in diameter. The ZnO and glass can be mixed by other suitable methods, such as spray-drying techniques.

The powder mixture is poured into a suitable steel die and then made into thin discs or other suitable shapes in a single or double action uni-axial press. These discs are then preferably placed in an isostatic or hydrostatic press, in which the single or double action uni-axially pressed body is placed in a flexible evacuated container, and the container placed in a pressure transmitting fluid such as a water-oil mixture, which mixture is then subjected to equal pressure on all sides.

The pressure used in the standard uni-axial press is between about 500 psi. to about 15,000 psi. (36 kg./sq. cm. — 1,080 kg./sq. cm.) and the pressure used in the isostatic press is between about 15,000 psi. to about 40,000 psi. (1,080 kg./sq. cm. — 2,880 kg./sq. cm.). The use of isostatic pressing insures that the density through the sample is substantially uniform at between about 50 to 60% of theoretical density. This helps to eliminate the problems of varying bulk density and varying electrical properties in the final product.

The pressed powder body is then heated at a temperature and for a time effective to completely sinter the powder masses to form a ZnO ceramic. Sintering will generally be carried out at a sintering temperature of between about 900° C to about 1,400° C preferably between about 1,000° C to about 1,200° C, for about 1 to 4 hours. In this step, the rate of increasing temperature is between about 75° C/hr. to about 150° C/hr.

During sintering the additive glass will soften and flow to completely surround, coat and bond the ZnO ceramic particles together. The ZnO will remain in discrete grains. The final product will generally shrink substantially and have a density at the ends of a disc of between about 85 to about 98% of the theoretical density of the single phase pure ZnO. The density will be substantially uniform throughout the mass, i.e., one that will vary no more than about 10%, and preferably no more than about 5%, throughout the pressed sintered body. If the density at the end of the body is 95%, then the density in the middle of the body will be between about 95 and 85%, but usually between about 95 to 92%. Using the method of this invention, sintered bodies having diameters about 1 to 3 in. and thicknesses of about ⅛ to ½ in. can be fabricated and are particularly useful in lightning arresters.

FIG. 1 shows a cross-section of the sintered pellet 10, showing the ZnO ceramic grains 11, and the grain boundary of oxide insulation 12, formed from the glass, which forms a thin layer surrounding each ZnO grains. In the sintered body, the ZnO grains will be coated and bound together by the oxide additive insulation. This additive oxide layer is effective to produce the electrical non-linearity characteristics of the ZnO ceramics.

The voltage limiting characteristic of these surge protective materials is believed to be due to the character of the grain boundary within the bulk or body of the material, which is near-insulating at low voltage and conducting at a high voltage. On impressing a voltage, the resistance changes from a linear function of I (current) and V (voltage) -Ohm's Law, to a power function of $I\alpha V\alpha$, where $\alpha$, the non-ohmic exponent, is a measure of non-linearity, and has a value greater than one. The final product of this invention can exhibit a high degree of non-linearity, $\alpha$ greater than 65, when subjected to a voltage surge. The voltage at the onset of non-linearity may be defined as the breakdown voltage (BOV).

Figure 2:
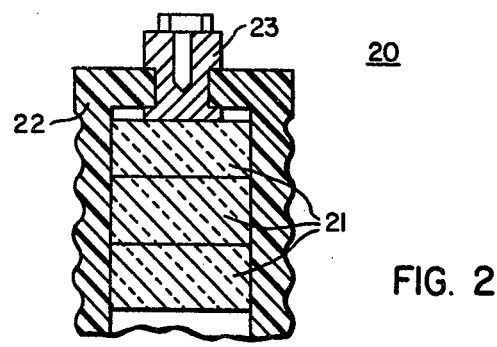
FIG. 2 is a cross-sectional view through a lightning arrester.

FIG. 2 shows one embodiment of an arrester 20 comprising as a characteristic element at least one voltage-nonlinear surge protective resistor body of this invention as lightning arrester component 21, enveloped in a porcelain insulator 22 with associated line terminal 23. As a non-linear resistor, sintered bodies made in accordance with this invention can be lapped at opposite surfaces by abrasive powder and provided with electrodes applied by any suitable method such as silver painting, vacuum evaporation or flame spraying of a metal such as Al or Sn.

EXAMPLE 1

A glass was made from a mixture of oxides consisting of 30 mole % (58 wt.%) $Bi_2O_3$; 20 mole % (24 wt.%) $Sb_2O_3$; 5 mole % (5 wt.%) $Co_3O_4$; 10 mole % (3.6 wt.%) $MnO_2$; 5 mole % (1.4 wt.%) $B_2O_3$; 10 mole % (3.4 wt.%) ZnO and 20 mole % (4.5 wt.%) $SiO_2$. These oxides, in analytic grade powder form, were weighed out and grind-mixed in a dry ball mill, containing zirconia media, for 24 hours.

The additive oxide powder mixture was poured into a silica crucible and placed in a furnace, brought to an operating temperature of about 1,450° C to form a molten, chemically homogeneous, single phase glass. The furnace contained silicon carbide resistive heating elements. The melt was stirred at about ½ hour intervals and left in the furnace for about 2 hours.

The molten glass from the crucible was then poured into an ice water bath to quench and solidfy the molten material, and form a porous, homogeneous, single phase glass. The porous, quenched glass was then ball-milled with acetone in a ball mill, containing zirconia media, for about 12 hours. The mixture, after drying in an oven at about 50° C was passed through a 149 micron screen (100 mesh U.S. Screen No.). This homogeneous glass powder was then ready as an additive to form ZnO non-linear ceramics.

A mix was then made by adding 25 parts by weight of the glass powder to 75 parts by weight of analytic grade ZnO powder. This provided a two phase system of ZnO and glass. The two components were grind-mixed with acetone in a ball mill, containing zirconia media, for about 12 hours to homogeneously mix the ZnO and glass. The wet admixture was then air dried in a drying oven, at about 50° C, to completely evaporate the acetone. The admixture was then passed through a 100 mesh screen. This homogeneously mixed ZnO-glass was then ready to be pressed into pellets and sintered to form non-linear V-I devices.

The powder was poured into a hollow steel die having about a 2.5 cm. diameter. Thin cylindrical discs were pre-pressed in a standard double action press at 10,000 psi. (720 kg./sq. cm.). The disc was then pressed in a standard isostatic press at about 30,000 psi. (2,140 kg./sq. cm.). The cylindrical pressed disc was removed from the isostatic press. It was strongly consolidated and easily handled, demonstrating excellent "green" strength. The "green" density of the disc was measured. The disc was of about 55% relative density and appeared to be substantially uniform in density through its thickness.

The pressed cylindrical disc was then placed in a Burrell tube furnace, with a heating zone of about 15.24 cm. (6 in.). The pressed disc was placed on 50 to 100 mesh zirconia in a zircon refractory boat. The furnace was raised to 1,200° C at a temperature increase of about 120° C/hr. and held at that sintering temperature for 2 hours to allow complete sintering of the ceramic body. The pellet was then cooled to provide a mass having ZnO ceramic particles bonded together by and coated with a boundary layer of a chemically homogeneous, single phase glass.

After the heat treatment, the pellet was given a light surface grinding, weighed and its dimensions measured. The diameter was about 2.0 cm., showing approximately 25% diametral shrinkage. The thickness was about 0.13 cm. and the density was about 5.4 grams/cu. cm. The sample was of about 95% relative density and appeared to be completely homogeneous and almost completely uniform in density through its thickness, with an apparent variation of approximately 5%. This provided an extremely uniformly dense voltage-nonlinear resistor useful for lightning arrester component application.

Figure 3:
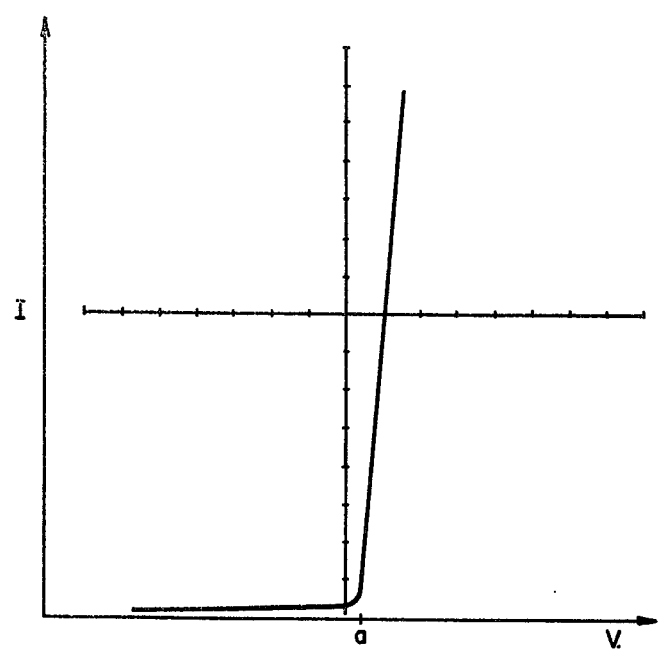
FIG. 3 is a graph of the V-I characteristics of the sintered pellets of this invention.

The ground disc was coated with an air-drying silver film and then subjected to low current AC testing which consisted of recording the voltage-current characteristics on an oscilloscope (Tektronix Type 576) with the current being limited to 10 ma. A 60 Hz. half-wave voltage source and a two-point probe technique were employed to sense the current flow. The V-I curve is shown in FIG. 3. At the beginning, there was a slow rise of current indicating the ZnO body was acting as a near insulator, but at a breakover voltage (a) the current increased suddenly, indicating the ZnO body was then acting as a conductor. The non-linear coefficient $\alpha$ was estimated to be about 70, making it particularly suitable for lightning arrester application.

Additional pellets were made using the same glass forming, pressing and sintering techniques, and using the same additive glass composition, but different amounts of ZnO powder. At 1.0 wt.% additive glass and 99 wt.% ZnO, the pellet showed linear characteristics as a conductor. At 2.5 wt.% additive glass and 97.5 wt.% ZnO, the non-linear coefficient was 3.1. At 20 wt.% additive glass and 80 wt.% ZnO, the non-linear coefficient was 24.1. At 30 wt.% additive glass and 70 wt.% ZnO, the non-linear coefficient was 52. At 40 wt.% additive glass and 60 wt.% ZnO, the non-linear coefficient was 3.0 and at 50 wt.% additive glass and 50 wt.% ZnO, the pellet again showed linear characteristics, but as an insulator. The mole ratio of additive oxides could be varied, and other oxide additives heretofore described could be used to produce useful non-linear devices.

The 25 wt.% additive glass and 75 wt.% ZnO powder material was also sintered at varying temperatures and times. At 1,100° C for 2 hours, the non-linear coefficient was 64. At 1,200° C for 4 hours, the non-linear coefficient was 39 (a drop from 70 for 1,200° C for 2 hours). At 1,300° C for 1 hour, the non-linear coefficient was 44.

We claim:

1. A method of making a homogeneous, sintered, resistor body, having a substantially uniform density, which can exhibit non-linear V-I characteristics, comprising the steps of:
   (A) mixing metallic oxide powders comprising about 10 mole % to about 60 mole % of $Bi_2O_3$, about 5 mole % to about 15 mole % of ZnO, about 2 mole % to about 15 mole % of $MnO_2$, about 2 mole % to about 10 mole % of $Co_3O_4$, about 5 mole % to about 40 mole % of $SiO_2$, about 1 to about 15 mole % of $B_2O_3$ and 0 to about 30 mole % of $Sb_2O_3$, and melting the mixture at a temperature of between about 1,100° and 1,600° C for a time effective to form a single phase, chemically homogeneous glass melt, and then
   (B) quenching the glass melt to form a single phase, chemically homogeneous porous glass, and then
   (C) grinding the glass to form fine glass particles, and then
   (D) mixing:
      (1) 2.5 weight % to 40 weight % of the single phase, chemically homogeneous glass particles with (2) 60 weight % to 97.5 weight % of ZnO particles, by a spray drying technique to form a two component mixture, and then (E) pressing the glass and ZnO mixture at pressures of between about 500 psi. to about 40,000 psi. to form a consolidated body having a substantially uniform density, and then (F) sintering the pressed body, at a temperature of between about 900° and 1,400° C, at a temperature rate increase of between about 75° C/hr. to about 150° C/hr., for 1 to 4 hours, to form a ceramic body consisting of ZnO particles, and a single phase, chemically homogeneous coating formed from the glass and binding the ZnO particles together, wherein the density throughout the mass will vary no more than about 10%, said sintered body exhibiting non-linear V-I characteristics.

2. The method of claim 1, wherein metallic oxide powders mixed in step (A) can also include CoO, MnO, $Cr_2O_3$, $TiO_2$, $Ta_2O_5$, FeO, $In_2O_3$, $Al_2O_3$, $SnO_2$, $Sn_3O_4$, $Mo_2O$, BaO, SrO, PbO, NiO, CaO, MgO, $CeF_3$ and their mixture, and density through the consolidated body, after pressing in step (E) is between about 50 to about 60% of theoretical density.

3. The method of claim 2, wherein the density at the ends of the sintered body, after sintering in step (F) is between about 85% to about 98% of theoretical density.

4. The method of claim 3, wherein the glass melt is quenched in an ice water bath.

5. The method of claim 3, wherein the glass particles and the ZnO particles mixed in step (D) have an average particle size of between about 0.5 micron to about 125 microns diameter.

6. A sintered body made by the method of claim 3.

* * * * *